(12) United States Patent
Fernandez-Orellana et al.

(10) Patent No.: US 11,315,372 B2
(45) Date of Patent: Apr. 26, 2022

(54) ZONE LEARNING FOR ENABLING FRICTIONLESS BUILDING INTERACTION

(71) Applicant: CARRIER CORPORATION, Palm Beach Gardens, FL (US)

(72) Inventors: Pedro Fernandez-Orellana, Shanghai (CN); Ankit Tiwari, South Windsor, CT (US); Kunal Srivastava, Manchester, CT (US); Lakshman Subramanian, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/255,123

(22) PCT Filed: Jun. 17, 2019

(86) PCT No.: PCT/US2019/037417
§ 371 (c)(1),
(2) Date: Dec. 22, 2020

(87) PCT Pub. No.: WO2019/245936
PCT Pub. Date: Dec. 26, 2019

(65) Prior Publication Data
US 2021/0272399 A1      Sep. 2, 2021

(30) Foreign Application Priority Data
Jun. 22, 2018   (CN) .......................... 201810658895.6

(51) Int. Cl.
*G07C 9/00*      (2020.01)
*G07C 9/20*      (2020.01)
*H04W 4/021*    (2018.01)

(52) U.S. Cl.
CPC ........... *G07C 9/00309* (2013.01); *G07C 9/20* (2020.01); *H04W 4/021* (2013.01); *G07C 2009/00587* (2013.01); *G07C 2009/00642* (2013.01)

(58) Field of Classification Search
None
See application file for complete search history.

(56) References Cited

U.S. PATENT DOCUMENTS

| 8,554,765 B2 | 10/2013 | Singh et al. |
| 9,137,746 B2 | 9/2015 | Gillett et al. |

(Continued)

FOREIGN PATENT DOCUMENTS

| EP | 3447216 A1 * | 2/2019 | ............ H04W 64/00 |
| WO | 2017183690 A1 | 10/2017 | |

OTHER PUBLICATIONS

Bian, et al.; "The New Intelligent Home Control System Based on the Dynamic and Intelligent Gateway"; Abstract; 4th IEEE International Conference on Broadband Network and Multimedia Technology; Oct. 2011; 2 pgs.

(Continued)

*Primary Examiner* — Carlos Garcia
(74) *Attorney, Agent, or Firm* — Cantor Colburn LLP

(57) ABSTRACT

According to one embodiment, a method of conserving energy while seeking to wirelessly actuate an access control using a mobile device is provided. The method including: searching for a wireless signal at a first rate; detecting a wireless signal; generating a zone of interest; detecting positional data of a mobile device; and searching for a wireless signal at a second rate greater than the first rate when positional data of the mobile device indicates that the mobile device is within the zone of interest.

20 Claims, 3 Drawing Sheets

(56) References Cited

U.S. PATENT DOCUMENTS

| | | | |
|---|---|---|---|
| 9,204,257 B1 | 12/2015 | Mendelson | |
| 9,215,553 B2 | 12/2015 | Rowles | |
| 9,538,459 B1 | 1/2017 | Shirriff et al. | |
| 2006/0152374 A1* | 7/2006 | Singer | G08B 13/2454 340/573.4 |
| 2009/0270091 A1 | 10/2009 | Joshi et al. | |
| 2012/0047184 A1 | 2/2012 | Purdy | |
| 2013/0267255 A1 | 10/2013 | Liu et al. | |
| 2014/0092771 A1* | 4/2014 | Siomina | H04W 24/08 370/252 |
| 2014/0105086 A1 | 4/2014 | Chhabra et al. | |
| 2014/0315546 A1 | 10/2014 | Chen | |
| 2015/0350828 A1 | 12/2015 | Marti et al. | |
| 2016/0219408 A1 | 7/2016 | Yang et al. | |
| 2019/0080539 A1 | 3/2019 | Yoshikawa et al. | |
| 2019/0364492 A1* | 11/2019 | Azizi | H04W 48/16 |

OTHER PUBLICATIONS

Kim, et al.; "Improving Energy Efficiency of WiFi Sensing on Smartphones"; Abstract; INFOCOM, 2011 Proceedings IEEE Conference; Shanghai, China; Apr. 2011; 2 pgs.

Mainwaring, et al.; "Wireless Sensor Networks for Habitat Monitoring"; Abstract; WSNA 2002 Proceedings of the 1st ACM Internat'l Workshop on Wireless Sensor Networks and Applications; 2 pgs.

Notification of Transmittal of the International Search Report for International Application No. PCT/US2019/037417; Report dated Jul. 25, 2019; Report Received Date Aug. 1, 2019; 5 pages.

Sang, et al.; "iScan: Efficient WiFi Scan for Mobile Device Based on Client and Network Behavior Learning"; Abstract IEEE Explore; Internet; URL: http://ieeexplore.ieee.org/abstract/document/8024674/citations; 2018; 2 pgs.

Written Opinion of the International Searching Authoriy for International Application No. PCT/US2019/037417; Report dated Jul. 25, 2019; Report Received Date Aug. 1, 2019; 9 pages.

* cited by examiner

ZONE LEARNING FOR ENABLING FRICTIONLESS BUILDING INTERACTION

BACKGROUND

The subject matter disclosed herein generally relates to the field of systems controlled by mobile devices, and more particularly to an apparatus and method for conserving mobile device battery energy when operating the system.

Existing access controls may allow an individual to unlock doors via a mobile device however this may lead the mobile device to continuously monitoring for when the individual intends to the unlock the door. This continuous monitoring may lead to a high battery consumption of mobile devices.

BRIEF SUMMARY

According to one embodiment, a method of conserving energy while seeking to wirelessly actuate an access control using a mobile device is provided. The method including: searching for a wireless signal at a first rate; detecting a wireless signal; generating a zone of interest; detecting positional data of a mobile device; and searching for a wireless signal at a second rate greater than the first rate when positional data of the mobile device indicates that the mobile device is within the zone of interest.

In addition to one or more of the features described above, or as an alternative, further embodiments may include that prior to the generating a zone of interest, the method further includes: connecting to the wireless signal; transmitting an access request from the mobile device to an access control; and actuating the access control.

In addition to one or more of the features described above, or as an alternative, further embodiments may include that the wireless signal is transmitted by the access control and detected by the mobile device.

In addition to one or more of the features described above, or as an alternative, further embodiments may include that the wireless signal is transmitted by the mobile device and detected by the access control.

In addition to one or more of the features described above, or as an alternative, further embodiments may include: searching for a wireless signal at a third rate less than the second rate when positional data of the mobile device indicates that the mobile device is outside of the zone of interest or motionless for a selected period of time.

In addition to one or more of the features described above, or as an alternative, further embodiments may include that the third rate is equal to the first rate.

In addition to one or more of the features described above, or as an alternative, further embodiments may include: receiving a manual input from the mobile device; and adjusting the zone of interest in response to the manual input.

In addition to one or more of the features described above, or as an alternative, further embodiments may include: receiving a manual input from the mobile device; and generating a second zone of interest in response to the manual input.

In addition to one or more of the features described above, or as an alternative, further embodiments may include that the selected range of the zone of interest is adjusted in response to the manual input.

In addition to one or more of the features described above, or as an alternative, further embodiments may include that the detecting positional data of a mobile device further includes: determining a distance between the mobile device and the access control in response to a signal strength of the wireless signal.

In addition to one or more of the features described above, or as an alternative, further embodiments may include that the wireless signal is Bluetooth.

According to another embodiment, a computer program product tangibly embodied on a computer readable medium is provided. The computer program product including instructions that, when executed by a processor, cause the processor to perform operations including: searching for a wireless signal at a first rate; detecting a wireless signal; connecting to the wireless signal; transmitting an access request from the mobile device to an access control; actuating the access control; generating a zone of interest; detecting positional data of the mobile device; and searching for a wireless signal at a second rate greater than the first rate when positional data of the mobile device indicates that the mobile device is within the zone of interest.

In addition to one or more of the features described above, or as an alternative, further embodiments may include that prior to the generating a zone of interest, the operations further include: connecting to the wireless signal; transmitting an access request from the mobile device to an access control; and actuating the access control.

In addition to one or more of the features described above, or as an alternative, further embodiments may include that the wireless signal is transmitted by the access control and detected by the mobile device.

In addition to one or more of the features described above, or as an alternative, further embodiments may include that the wireless signal is transmitted by the mobile device and detected by the access control.

In addition to one or more of the features described above, or as an alternative, further embodiments may include that the operations further include: searching for a wireless signal at a third rate less than the second rate when positional data of the mobile device indicates that the mobile device is outside of the zone of interest or motionless for a selected period of time.

In addition to one or more of the features described above, or as an alternative, further embodiments may include that the third rate is equal to the first rate.

In addition to one or more of the features described above, or as an alternative, further embodiments may include that the operations further include: receiving a manual input from the mobile device; and adjusting the zone of interest in response to the manual input.

In addition to one or more of the features described above, or as an alternative, further embodiments may include that the operations further include: receiving a manual input from the mobile device; and generating a second zone of interest in response to the manual input.

In addition to one or more of the features described above, or as an alternative, further embodiments may include that the selected range of the zone of interest is adjusted in response to the manual input.

Technical effects of embodiments of the present disclosure include tracking a location, position, and movement of a mobile device relative to access controls in order to determine zones of interest for the mobile device and increase sensing rate when the mobile device is within the zone of interest.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
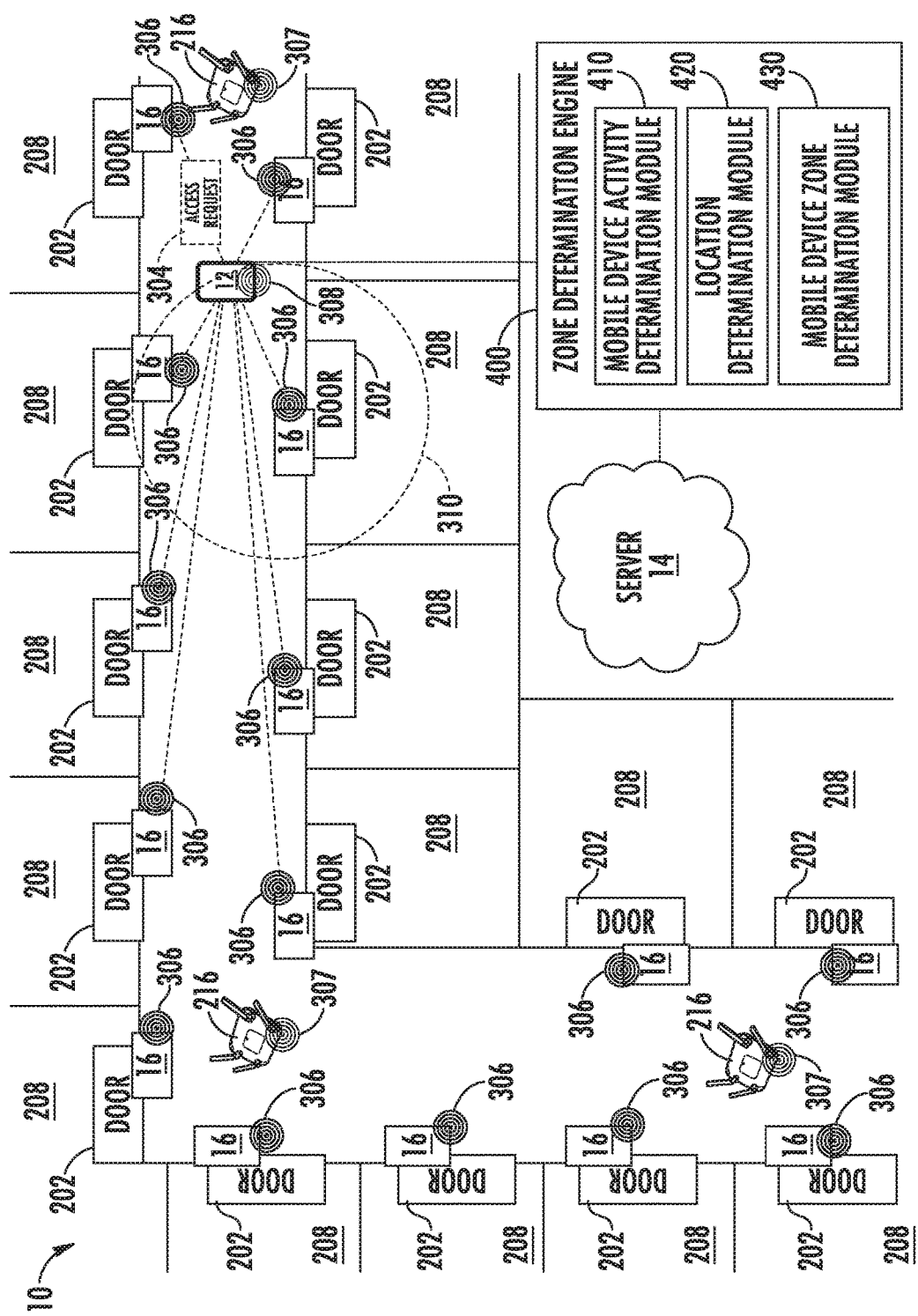
FIG. 1 illustrates a general schematic system diagram of an access control system, in accordance with an embodiment of the disclosure.

FIG. 1 schematically illustrates an access control system 10. The system 10 generally includes a mobile device 12, a server 14, a wireless access protocol device 216, and an access control 16. The access control system 10 may include any number of access controls 16. It should be appreciated that, although particular systems are separately defined in the schematic block diagrams, each or any of the systems may be otherwise combined or separated via hardware and/or software. In the illustrated embodiment, the access controls 16 may control access through a door 202 to a room 208. The access control system 10 may include any number of doors 202 and rooms 208. Further, there may be multiple doors 202 and access controls 16 for each room 208. It is understood that while the access control system 10 utilizes a door 202 and room 208 system for exemplary illustration, embodiments disclosed herein may be applied to other access control systems such as, for example, elevators, turnstiles, safes, etc.

A mobile device 12 belonging to an individual may be granted access to one or more access controls 16 (e.g. the door lock on an office or hotel room assigned to the individual). In one example, when an individual begins working at a new building their mobile device 12 will be granted access to particular rooms 208 where they are allowed to enter and/or work. In another example, when an individual checks into the hotel room their mobile device 12 will be granted access to a room 208. There may be one or more mobile devices 12 assigned to a room 208 (e.g. a husband and a wife in a hotel; or multiple workers in a collaborative workspace), thus embodiments disclosed herein may apply to multiple mobile devices 12 per room 208. An individual may utilize their mobile device 12 to unlock and/or lock the access control 16 operably connected to their assigned room 208 through an access request 304. The mobile device 12 may store credentials to unlock and/or lock the access control 16. Some credentials may be used for multiple access controls 16 if there are multiple access controls 16 for a single assigned room 208 or the individual is assigned access to multiple rooms 208. For example, an access control 16 operably connected to an individual's hotel room and an access control 16 operably connected to a hotel pool may respond to the same credential. Other credentials may be specific to a single access control 16.

Wireless communication may occur between the access control 16 and the mobile device 12 via short range wireless communication, such as for example Wi-Fi, Bluetooth, ZigBee, infrared, or any other short-range wireless communication method known to one of skill in the art. In an embodiment, the short-range wireless communication is Bluetooth. The mobile device 12 may have to be within a selected range of the access control 16 in order to utilize short-range wireless communication. For example, the selected range may be manually set by an individual as a chosen range or automatically set based on the limitations of hardware associated with the mobile device 12 and/or the access control 16.

Each access control 16 is a wireless-capable, restricted-access, or restricted-use device such as wireless locks, access control readers for building entry, and other restricted-use machines. The mobile device 12 submits credentials to the access controls 16, thereby selectively permitting a user to actuate (i.e., access or activate) functions of the access controls 16. A user may, for example, submit a credential to an electromechanical lock to unlock it, and thereby gain access to a room 208.

The mobile device 12 may transmit an access request 304 to the access control 16 by short-range radio transmission when the mobile device 12 is placed proximate the access control 16. The mobile device 12 is a wireless capable handheld device such as a smartphone that is operable to communicate with the server 14 and the access controls 16. The server 14 may provide credentials and other data to the access control 16, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data. The access controls 16 may communicate directly with the server 14 or through the wireless access protocol devices 216 or through the mobile device 12.

The system 10 may include a zone determination engine 400 configured to determine a zone of interest 310 for the mobile device 12 adjust the rate of sensing apparatus (i.e. the mobile device 12 and/or the access controls 16) depending on whether the mobile device 12 is within the zone of interest 310. The zone of interest 310 may be an area around an access control 16 or a group of selected access controls 16 at a selected range, which may be a numerical radius round an access control (as shown in FIG. 1) or a designated location (e.g., a specific building, room, etc). For example, the zone of interest 310 may be a set of geographical coordinates, a range away from a geographical coordinate, a building, a section of the building, a floor in the building, a hallway in the building, a room in the building, and a specific distance between the mobile device 12 and a specific access control 16. The rate of the sensing devices may be increased when the mobile device is within the zone of interest 310 and decreased when the mobile device is not within the zone of interest 310. The zone determination engine 400 is comprised of modules including a mobile device activity determination module 410; a location determination module 420; and a mobile device zone determination module 430. Each module 410, 420, 430 may be located on either the mobile device 12 or the server 14.

Alternatively, the modules 410, 420, 430 may be distributed between the mobile device 12 and the server 14.

The mobile device activity determination module 410 uses an inertial measurement unit (IMU) sensor 57 (see FIG. 2) on the mobile device 12 to detect and record when the individual interacted with an access control 16, the delay of the interaction, and other metrics to model user behavior and routine. The IMU may detect a position of a mobile device 12 (e.g., how the mobile device 12 is carried by the individual: in a hand of an individual, a back pocket of an individual, a front pocket of an individual) and an activity of an individual carrying the mobile device 12 (e.g., sitting, standing, moving, slowing, accelerating, and stopping). The position or activity of the mobile device 12 may be indicative of intent of the individual. The IMU sensor 57 may be composed of one or more sensors including but not limited to an accelerometer and a light sensing. The mobile device activity determination module 410 tracks interactions between the mobile device 12 and each access control 16. For example, each time the mobile device 12 transmits an access request to an access control 16, the access control 16 will be saved or book marked.

The mobile device location determination 420 is configured to detect positional data of the mobile device 12. The position data may include the location of the mobile device 12 at various granularity levels including but not limited to a geographical coordinate, a building where the mobile device 12 is located, a section of the building where the mobile device 12 is located, a floor in the building where the mobile device 12 is located, a hallway in the building where the mobile device 12 is located, a room where the mobile device 12 is located, and a distance between the mobile device 12 and each of the access controls 16. For example, from the distance between the mobile device 12 and each of the access controls 16, a location within the system 10 (i.e. a building) may be determined, since the location of each access controls 16 is already known. The mobile device location determination module 420 may also be configured to further refine the location of the mobile device 12 in response to the position of the mobile device 12 detected by the mobile device activity determination module 410 (e.g., a different location offset is applied if the mobile device 12 is in back pocket vs. front pocket of the individual carrying the mobile device 12). Knowing the position of the mobile device 12 is advantageous because the human body can cause interference in signal strength for wireless signals (e.g., Wi-Fi, Bluetooth, etc.), thus having the mobile device 12 in front or back pocket may cause the mobile device 12 to be in direct line of sight of the access control 16 or position an individual's body in between the mobile device 12 and the access control 16. Also advantageously, knowing the position of the mobile device 12 may help determine intent.

The mobile device destination zone determination module 430 is configured to determine zones of interest 310 for an individual carrying the mobile device 12 in response to the position of the mobile device 12, interactions between the mobile device 12 and access controls 16, and the positional data of the mobile device 12.

An individual carrying a mobile device 12 may be tracked for a selected period of time, which may be referred to as the commissioning/learning period. During the commissioning period a plurality of data points are tracking including but not limited to each position of the mobile device 12, activity of the mobile device 12, interaction of the mobile device 12, and positional data of the mobile device 12 may be tracked and associated with a zone of interest 310. The zone of interest 310 may vary in size depending on the configuration of the system, the relative proximity of access controls 16, and the capabilities of the mobile device 12. For example, the zone of interest 310 may be a set of geographical coordinate, a range away from a geographical coordinate, a building, a section of the building, a floor in the building, a hallway in the building, a room in the building, and a specific distance between the mobile device 12 and a specific access control 16. The mobile device 12 may have one or more zones of interest 310s. Depending on the access controls 16 that the mobile device 12 interacts with and/or may interact with.

After a commissioning or learning period, the specific preferences and tendencies of an individual carrying a mobile device 12 may be captured for each zone of interest 310 of the individual. It is understood that learning period could be an "indefinite" period (i.e., a continuous learning during the whole life cycle of the system) and zones of interest 310 can be refined, created, and deleted continuously. In an embodiment, a commissioning or learning period may not be required, rather the zone of interests 310 may be established manually by an individual (e.g., a system administrator). Sensing interaction between the mobile device 12 and access controls 12 within the zone of interest 310 may be increased when the mobile device 12 is within the zone of interest 310. For example, a zone of interest 310 may be determined to be within a building, so the rate at which the mobile device 12 attempts to detect the access controls 16 will begin or increase when mobile device 12 is within the building. Advantageously, by only starting to detect or increasing the rate of detection signals when the mobile device is within the zone of interest 310, the battery life of the mobile device 12 is conserved.

The positional data of the mobile device 12 may be detected using one or more methods and apparatus. The positional data may be collected by the mobile device 12 and/or the server 14. The positional data may include a location of the mobile device 12 and/or a movement of mobile device 12 that is a derivative of a location of the mobile device 12, such as, for example, velocity, acceleration, jerk, jounce, snap . . . etc. The mobile device 12 may a determine positional data by the GPS 48, by the IMU sensor 57, wireless signal strength, and/or by triangulating wireless signals 307 from the wireless access protocol device(s) 216 or wireless signals 306 from the access control(s) 16. The location of the mobile device 12 may also be detected through triangulation of wireless signals emitted from the mobile device 12 or signal strength of wireless signals emitted from the mobile device 12. The location of the mobile device 12 may be detected using any other desired and known location detection/position reference means.

The access control 16 may be configured to continuously advertise a wireless signal 306. The advertisement is the access control 16 declaring its presence to any nearby listening device and if it is a connectable advertisement it is an opportunity for another device (i.e., nearby mobile device 12) to connect to the access control 16. For example, the wireless signal 306 of the access control 16 may be a Bluetooth signal. The mobile device 12 is configured to detect the wireless signal 306 and determine positional data of the mobile device 12 in response to a signal strength of the wireless signal 306. In an embodiment, once the zones of interest 310 are determined, the mobile device 12 may only be configured to detect the wireless signal 306 of the access controls when the mobile device 12 is within the zone of interest 310. In another embodiment, once the zones of interest 310 are determined, the mobile device 12 may increase the rate of attempts to detect the wireless signal 306 of the access controls 16 when the mobile device 12 is within the zone of interest 310. Advantageously, by increasing the rate of attempts to detect the wireless signal 306 of the access controls 16 when the mobile device is within the zone of interest 310 helps to increase the speed of interaction between the mobile device 12 and the access control 16, thus a connections between the access control 16 and the mobile device 12 will be made faster and access requests from the mobile device 12 to the access control 16 will be answered quicker.

Positional data of the mobile device 12 may also be determined using the wireless access protocol device 216. The wireless access protocol device 216 may be configured to advertise a wireless signal 307. The advertisement is the wireless access protocol device 216 declaring its presence to any nearby listening device and if it is a connectable advertisement it is an opportunity for another device (i.e., nearby mobile device 12) to connect to the wireless access protocol device 216. For example, the wireless signal 307 of the wireless access protocol device 216 may be a Wi-Fi signal. The mobile device 12 is configured to detect the wireless signal 307 and determine a positional data of the mobile device 12 in response to a signal strength of the wireless signal 307.

Positional data of the mobile device 12 may also be determined using the wireless access protocol device 216 and/or the access controls 16 to detect a wireless signal 308 advertised by the mobile device 12. The mobile device 12 may be configured to advertise a wireless signal 308. The advertisement is the mobile device 12 declaring its presence to any nearby listening device and if it is a connectable advertisement it is an opportunity for another device (i.e., access control 16 or wireless access protocol device 216) to detect this advertisement and triangulate the location of the mobile device 12. The wireless access protocol device 216 and/or the access controls 16 are configured to detect the wireless signal 308 and determine a positional data of the mobile device 12 in response to a signal strength of the wireless signal 308. The location of the mobile device 16 may be triangulated by relaying up to the location determination module 420 the strength of each wireless signal 308 detected and then the location determination module 420 can triangulate the position.

Wireless signal interaction data between the mobile device 12 and at least one of the access device 16 and the wireless access protocol device 216 may transmitted to the server 14 to determined positional data. In an embodiment, the location determination module 420 may be located on the server 14 and may be used to determine positional data. The server 14 may use signal strength detected between the mobile device 12, access controls 16, and the wireless access protocol device 216 to determine positional data of the mobile device 12.

Figure 2:
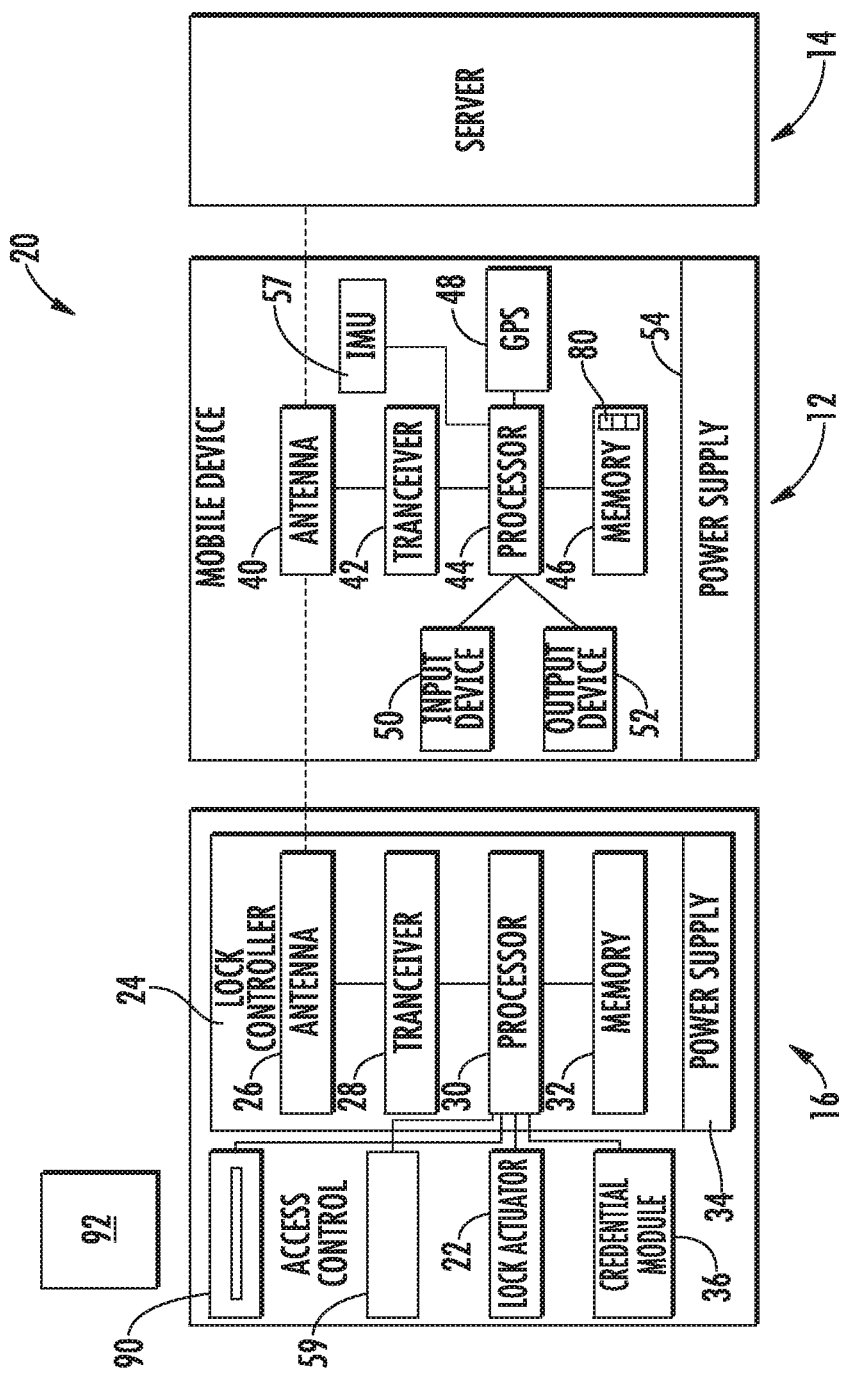
FIG. 2 illustrates a block diagram of an access control, mobile device and server of the access control system of FIG. 1, in accordance with an embodiment of the disclosure.

Referring now to FIG. 2 with continued reference to FIG. 1. FIG. 2 shows a block diagram of an example electronic lock system 20 includes the access control 16, the mobile device 12, and the server 14. The access control 16 generally includes a lock actuator 22, a lock controller 24, a lock antenna 26, a lock transceiver 28, a lock processor 30, a lock memory 32, a lock power supply 34, a lock card reader 90, and a credential module 36.

The access control 16 may have essentially two readers, one reader 90 to read a physical key card 92 and the credential module 36 to communicate with the mobile device 12 via the lock processor 30 and the transceiver 28 and antenna 26. In addition to utilizing the mobile device 12 to actuate the access control 16, a physical key card 92 may also be used to actuate the access control 16 by being inserted into the access control 16 for the access control 16 to read the physical key card 92 (e.g. a magnetic strip on an encoded card 92). The physical key card 92 is capable of being encoded with card data, such as, for example, a magnetic strip or RFID chip. The card data may include credentials to grant access to a specific access control 16. For example, for a period the mobile device 12 may be granted access to a specific access control 16, such as, for example, a period of stay/employment for the individual possessing the mobile device 12.

The access control 16 is responsive to credentials from the mobile device 12, and may, for example, be the lock of a turnstile or a door lock. Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately. In an embodiment, the access control 16 is composed of separate components a reader (e.g., transceiver 28 and/or antenna 26) at a door 202, a processor 30 that gets the credential from the reader, and then a lock actuator 22 that gets a signal from the processor 30 to actuate an electromechanical lock.

The lock transceiver 28 is capable of transmitting and receiving data to and from at least one of the mobile device 12, the wireless access protocol device 216, and the other access controls 16. The lock transceiver 28 may, for instance, be a near field communication (NFC), Bluetooth, infrared, ZigBee, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate credentials and determine the access rights contained in the credentials or to pass messages from a transceiver to a credential module 36 and to receive a response indication back from the credential module 36. The lock memory 32 may be RAM, EEPROM, or other storage medium where the lock processor 30 can read and write data including but not limited to lock configuration options. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

While FIG. 2 shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, a key power supply 54, and an IMU sensor 57. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. The mobile device 12 may also include a mobile device application 80. Embodiments disclosed herein, may operate through the mobile device application 80 installed on the mobile device 12. The IMU sensor 57 may be a sensor such as, for example, an accelerometer, a gyroscope, or a similar sensor known to one of skill in the art.

Figure 3:
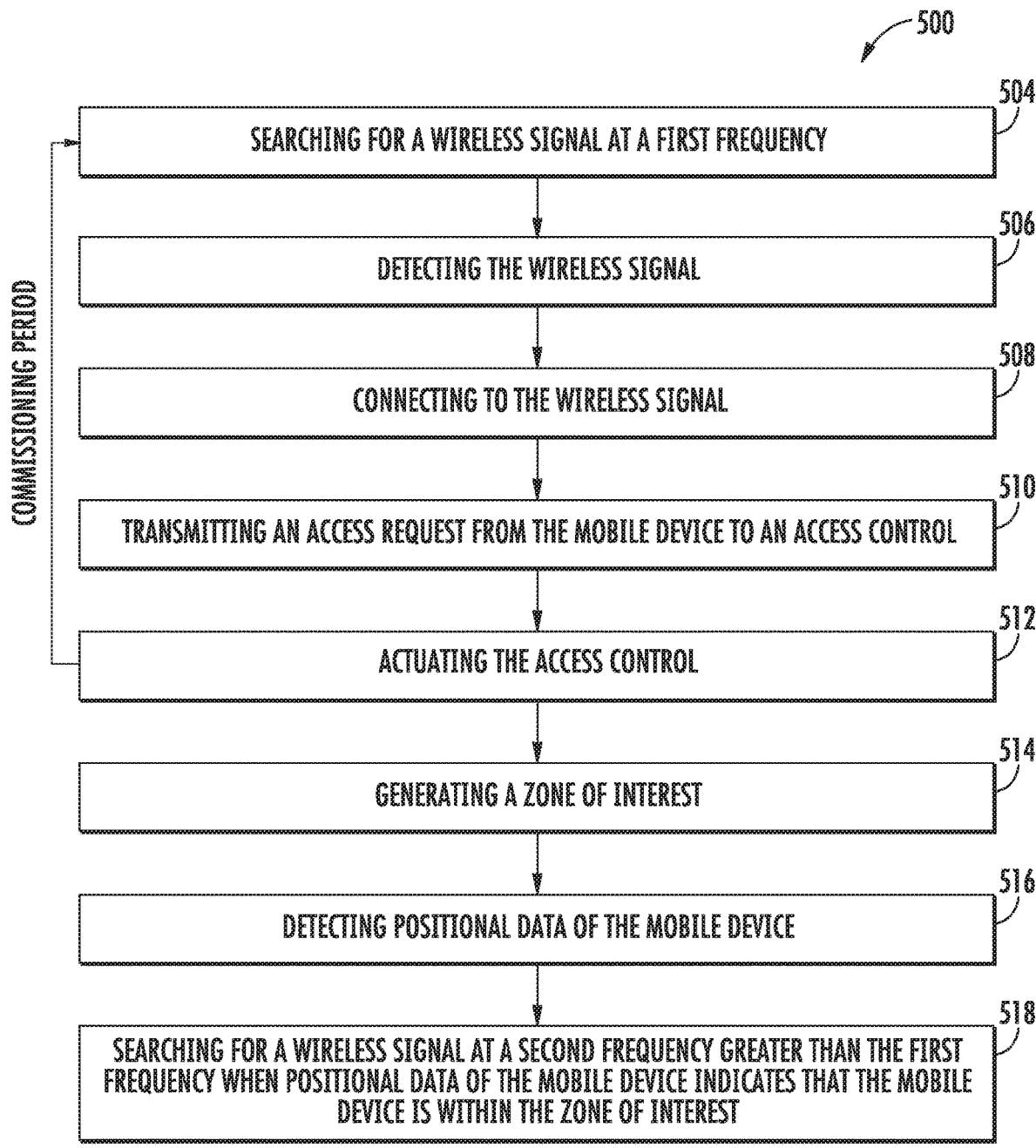
FIG. 3 is a flow diagram illustrating a method of conserving energy while seeking to wirelessly actuate an access control using a mobile device, according to an embodiment of the present disclosure.

Referring now to FIG. 3 with continued reference to FIGS. 1-2. FIG. 3 shows a flow chart of a method 500 of conserving energy while seeking to wirelessly actuate an access control 16 using a mobile device 12. The method 500 may be performed by the mobile device 12 and/or the server 14. At block 504, an apparatus searches for a wireless signal at a first rate. As mentioned above, in an embodiment, the apparatus may be the mobile device 12 searching for a wireless signal 306 transmitted by the access control 16 and then detected by the mobile device 12. In another embodiment, the apparatus may be the access control 16 searching for a wireless signal 308 transmitted by the mobile device 12 and then detected by the access control 16. At block 506, the wireless signal is detected. At block 508, the apparatus detecting the wireless signal then connects to the wireless signal. At block 510, an access request is transmitted from the mobile device 12 to an access control 16. At block 512, the access control 16 is actuated in response to the access request. Blocks 508-512 may not be required for the method 500 and a zone of interest may be generated in response to detecting the wireless signal at block 506. Block 512 may also include a credential transfer that identifies the mobile device 121 and confirms that the mobile device 12 has been authorized to access the access control 16.

Blocks 504-512 may be referred to as a commissioning period described above. The commission period may be repeated one or more times for the access control 16 before a zone of interest 310 may be generated for the access control 16. The commission period may be repeated for one or more access controls 16 before generating one or more zones of interest 310. Further, the commission period may continuously be carried out to further refine current zones of interest 310 and define new zones of interest 310.

At block 514, a zone of interest 310. At block 516, positional data of a mobile device 12 is detected in order to determine a location of the mobile device 12 in relation to generated zones of interest 310. At block 518, the apparatus searches for a wireless signal at a second rate greater than the first rate when positional data of the mobile device 12 indicates that the mobile device 12 is within the zone of interest 310. Advantageously, by increasing the rate of the wireless signal search, the apparatus may operate with increased speed when the mobile device 12 is located within the zone of interest 310. For example, first time mobile device interacts with an access control 16, there may be delay or not even automatic interaction because there was no zone of interest 310, so the individual carrying the mobile device 12 may have to wait several seconds for this automatic interaction or even do a manual interaction opening an app in the mobile device 12; however, after this happens, the system will create a zone of interest 310 and the next time the mobile device approaches this new zone 310, the mobile device 12 will detect the zone of interest 310 and start "sniffing" Bluetooth faster so it can detect the access control 16 as soon as possible and automatically interact with it so the individual does not experience any delay. Additionally, the apparatus searches for a wireless signal at a third rate less than the second rate when positional data of the mobile device 12 indicates that the mobile device 12 is outside of the zone of interest 310. Advantageously, by decreasing the rate of the wireless signal search, the apparatus conserves power. In an embodiment, the third rate may be about equal to the first rate. For example, the mobile device 12 does not search for a Bluetooth signal from the access control 16 when the mobile device 12 is not in the zone of interest 310. Furthermore, the apparatus may search for a wireless signal at a third rate less than the second rate when positional data of the mobile device 12 indicates that the mobile device 12 is motionless for a selected period of time. For instance, the zone of interest 310 may be an entire room of a building, however if the individual carrying the mobile device 12 is at rest in the room (e.g., working at the desk) then the individual may not be attempting to actuate an access control 16.

An individual user of the mobile device 12 may also manually adjust the zone of interest 310 through a manual input in the mobile device 12, then the zone of interest 310 is adjusted in response to the manual input when the manual input is received from the mobile device 12. An individual user of the mobile device 12 may create, delete, and/or combine zones of interest 310s through manual inputs into the mobile device 12. The individual user of the mobile device 12 may also adjust the selected range of the zone of interest 310 in response to the manual input.

While the above description has described the flow process of FIG. 3 in a particular order, it should be appreciated that unless otherwise specifically required in the attached claims that the ordering of the steps may be varied. Steps of the flow process may also be expanded or removed.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of conserving energy while seeking to wirelessly actuate an access control using a mobile device, the method comprising:
   searching for a wireless signal at a first rate;
   detecting a wireless signal;
   generating a zone of interest based on a relative distance between the mobile device and the access control;
   detecting positional data of a mobile device; and
   searching for the wireless signal at a second rate greater than the first rate when positional data of the mobile device indicates that the mobile device is within the zone of interest,
   wherein the access control is door lock.

2. The method of claim 1, wherein prior to the generating a the zone of interest, the method further comprises:
   connecting to the wireless signal;
   transmitting an access request from the mobile device to the access control; and
   actuating the access control,
   wherein actuating the access control further comprises unlocking the door lock.

3. The method of claim 1, wherein the wireless signal is transmitted by the access control and detected by the mobile device.

4. The method of claim 1, wherein the wireless signal is transmitted by the mobile device and detected by the access control.

5. The method of claim 1, further comprising:
   receiving a manual input from the mobile device; and
   generating a second zone of interest in response to the manual input.

6. The method of claim 1, wherein the detecting positional data of a mobile device further comprises:
   determining a distance between the mobile device and the access control in response to a signal strength of the wireless signal.

7. The method of claim 1, wherein the wireless signal is Bluetooth.

8. The method of claim 1, further comprising:
   searching for a wireless signal at a third rate less than the second rate when positional data of the mobile device indicates that the mobile device is outside of the zone of interest or motionless for a selected period of time.

9. The method of claim 8, wherein the third rate is equal to the first rate.

10. The method of claim 1, further comprising:
    receiving a manual input from the mobile device; and
    adjusting the zone of interest in response to the manual input.

11. The method of claim 10, wherein the selected range of the zone of interest is adjusted in response to the manual input.

12. A non-transitory computer program product tangibly embodied on a non-transitory computer readable medium, the non-transitory computer program including instructions that, when executed by a processor, cause the processor to perform operations comprising:
    searching for a wireless signal at a first rate;
    detecting a wireless signal;
    connecting to the wireless signal;
    transmitting an access request from the mobile device to an access control,
    wherein the access control is door lock;
    actuating the access control, wherein actuating the access control further comprises unlocking the door lock;
    generating a zone of interest based on a relative distance between the mobile device and the access control;
    detecting positional data of the mobile device; and
    searching for the wireless signal at a second rate greater than the first rate when positional data of the mobile device indicates that the mobile device is within the zone of interest.

13. The non-transitory computer program product of claim 12, wherein prior to the generating the zone of interest, the operations further comprise:
    connecting to the wireless signal;
    transmitting an access request from the mobile device to the access control; and
    actuating the access control, wherein actuating the access control further comprises unlocking the door lock.

14. The non-transitory computer program product of claim 12, wherein the wireless signal is transmitted by the access control and detected by the mobile device.

15. The non-transitory computer program product of claim 12, wherein the wireless signal is transmitted by the mobile device and detected by the access control.

16. The non-transitory computer program product of claim 12, wherein the operations further comprise:
    receiving a manual input from the mobile device; and
    generating a second zone of interest in response to the manual input.

17. The non-transitory computer program product of claim 12, wherein the operations further comprise:
    searching for a wireless signal at a third rate less than the second rate when positional data of the mobile device indicates that the mobile device is outside of the zone of interest or motionless for a selected period of time.

18. The non-transitory computer program product of claim 17, wherein the third rate is equal to the first rate.

19. The non-transitory computer program product of claim 12, wherein the operations further comprise:
    receiving a manual input from the mobile device; and
    adjusting the zone of interest in response to the manual input.

20. The non-transitory computer program product of claim 19, wherein the selected range of the zone of interest is adjusted in response to the manual input.

* * * * *